US012160136B2

(12) United States Patent
Titus et al.

(10) Patent No.: US 12,160,136 B2
(45) Date of Patent: Dec. 3, 2024

(54) SYSTEMS AND METHODS FOR INTELLIGENT POWER DISTRIBUTION

(71) Applicant: AT&T Intellectual Property I, L.P., Atlanta, GA (US)

(72) Inventors: David Titus, Schertz, TX (US); Stewart Barker, Lucas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 94 days.

(21) Appl. No.: 17/897,387

(22) Filed: Aug. 29, 2022

(65) Prior Publication Data

US 2022/0407348 A1  Dec. 22, 2022

Related U.S. Application Data

(63) Continuation of application No. 17/142,534, filed on Jan. 6, 2021, now Pat. No. 11,462,935, which is a continuation of application No. 15/914,819, filed on Mar. 7, 2018, now Pat. No. 10,951,056.

(51) Int. Cl.
*H02J 9/06* (2006.01)
*H04L 12/10* (2006.01)
*H04L 12/12* (2006.01)
*H04M 19/08* (2006.01)

(52) U.S. Cl.
CPC ............. *H02J 9/061* (2013.01); *H04L 12/10* (2013.01); *H04L 12/12* (2013.01); *H04M 19/08* (2013.01)

(58) Field of Classification Search
CPC .......... H02J 9/061; H04L 12/10; H04L 12/12; H04M 19/08
See application file for complete search history.

(56) References Cited

U.S. PATENT DOCUMENTS

| 8,818,192 B1 * | 8/2014 | Smith ................. H04B 10/808 398/171 |
| 8,963,367 B2 | 2/2015 | Melamed |
| 9,300,815 B2 | 3/2016 | Cooper et al. |
| 9,351,187 B2 | 5/2016 | Trojer |
| 9,509,518 B2 | 11/2016 | Rao et al. |

(Continued)

FOREIGN PATENT DOCUMENTS

| EP | 2362626 A1 | 8/2011 |
| EP | 3089438 B1 | 10/2017 |

(Continued)

OTHER PUBLICATIONS

Feldman, Daniel, "Reverse Powering Its Benefits and Constraints", Microsemi Corporation, 2014, 16 pages.

(Continued)

*Primary Examiner* — Carlos Amaya
(74) *Attorney, Agent, or Firm* — Guntin & Gust, PLC; Robert Gingher

(57) ABSTRACT

Methods and systems for providing intelligent power distribution. A distribution point unit is connected to a plurality of user units in a telecommunications system. A loss of power to the distribution point unit is detected. It is determined that at least one user unit has backup power. Based on a determination that at least one user unit has backup power, a power mode for the distribution point unit is selected. The power mode is implemented on the distribution point unit.

20 Claims, 4 Drawing Sheets

(56) References Cited

U.S. PATENT DOCUMENTS

| | | | |
|---|---|---|---|
| 9,571,669 | B2 | 2/2017 | Peker et al. |
| 9,621,712 | B2 | 4/2017 | Hillaert et al. |
| 9,628,283 | B2 | 4/2017 | Cooper |
| 9,667,436 | B2 | 5/2017 | Linney et al. |
| 2011/0266867 | A1 | 11/2011 | Schindler et al. |
| 2015/0078756 | A1 | 3/2015 | Soto et al. |
| 2016/0164687 | A1 | 6/2016 | Cooper |
| 2016/0204864 | A1 | 7/2016 | Linney et al. |
| 2016/0309045 | A1* | 10/2016 | Peker .................... H04M 19/08 |
| 2016/0330334 | A1 | 11/2016 | Cooper et al. |
| 2017/0272581 | A1 | 9/2017 | Cooper |
| 2017/0279635 | A1 | 9/2017 | Kerpez |

FOREIGN PATENT DOCUMENTS

| | | |
|---|---|---|
| EP | 3208969 B1 | 1/2019 |
| WO | 2009138710 A1 | 11/2009 |
| WO | 2016096583 A3 | 10/2016 |
| WO | 2016185381 A1 | 11/2016 |
| WO | 2016197819 A1 | 12/2016 |
| WO | 2017074669 A1 | 5/2017 |
| WO | 2017080277 A1 | 5/2017 |
| WO | 2017177646 A1 | 10/2017 |

OTHER PUBLICATIONS

Fredricx, Francois, "Power from the people: Reverse power feeding", Nokia, 2017, 5 pages.

\* cited by examiner

SYSTEMS AND METHODS FOR INTELLIGENT POWER DISTRIBUTION

CROSS REFERENCE TO RELATED APPLICATIONS

This application is a continuation of U.S. patent application Ser. No. 17/142,534 filed Jan. 6, 2021, which is a continuation of U.S. patent application Ser. No. 15/914,819 filed Mar. 7, 2018, now U.S. Pat. No. 10,951,056, the entire contents of both applications are hereby incorporated by reference herein for all purposes.

TECHNICAL FIELD

The technical field relates generally to power management and more specifically to distributing power in network communications equipment.

BACKGROUND

It is important for network services providers to protect their equipment from power failures. Without protection, if a power failure were to occur, then portions, or even the entirety, of a network could fail cause service disruptions for the users of the network. The type of protection may vary depending on the location of the equipment. For instance, a centrally located server farm may have one type of protection whereas user equipment, located within a user's premises, may have another type of protection. Often, a network service provider will provide back up for central locations while relying on users to back up the equipment located within their respective dwellings.

In certain network environments, such as fiber fed or copper access environments, there is often edge equipment that services multiple dwellings within a single unit. For example, an apartment building may have a distribution point unit (DPU) placed within a control area of a multi-dwelling unit. To protect the DPU from a power outage a backup power source would have to be co-located and maintained within or near the DPU. Providing power backup in this manner is not optimum for network service providers or the owners and operators of multi-dwelling units because the network service providers must maintain the backup equipment, and the owners must provide space for the backup equipment.

To overcome these difficulties, the present disclosure presents a methods and systems for intelligent power distribution.

SUMMARY

In one embodiment, a method for providing intelligent power distribution is provided. A distribution point unit is connected to a plurality of user units in a telecommunications system. A loss of power to the distribution point unit is detected. It is determined that at least one user unit has backup power. Based on a determination that at least one user unit has backup power, a power mode for the distribution point unit is selected. The power mode is implemented on the distribution point unit.

In one embodiment, a system for providing intelligent power distribution is provided. The system includes a processor and a memory coupled with the processor, the memory comprises executable instructions that when executed by the processor cause the processor to effectuate operations. The operations include detecting a loss of power to a distribution point unit. Determining that at least one user unit has backup power. Based on a determination that at least one user unit has backup power, selecting and implementing a power mode for the distribution point unit.

In one embodiment, a method of power operation in a network comprising a data distribution system and one or more destination systems that exchange data with the data distribution system is provided. A loss of power to the data distribution system is detected. At least one destination system is identified that includes an alternate power source. The data distribution system is enabled to receive power from the at least one destination system that includes an alternate power source.

In one embodiment determining comprises monitoring a communications interface and detecting at least one signal from that communications interface that originates from the at least one user unit. In one embodiment, determining comprises identifying in a database that the at least one user unit has backup power. In one embodiment, determining comprises determining that multiple user units have backup power. In one embodiment, selecting comprises calculating the power mode based on a number of the multiple user units that have backup power. In one embodiment, calculating comprises identifying one or more components of the distribution point unit that provide service to the multiple user units. In one embodiment implementing comprises supplying power to the components of the distribution point unit that provide service to the multiple user units. In one embodiment, power is disabled to components of the distribution point unit that do not provide service to the multiple user units.

BRIEF DESCRIPTION OF THE DRAWINGS

Aspects of the herein described methods and systems are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
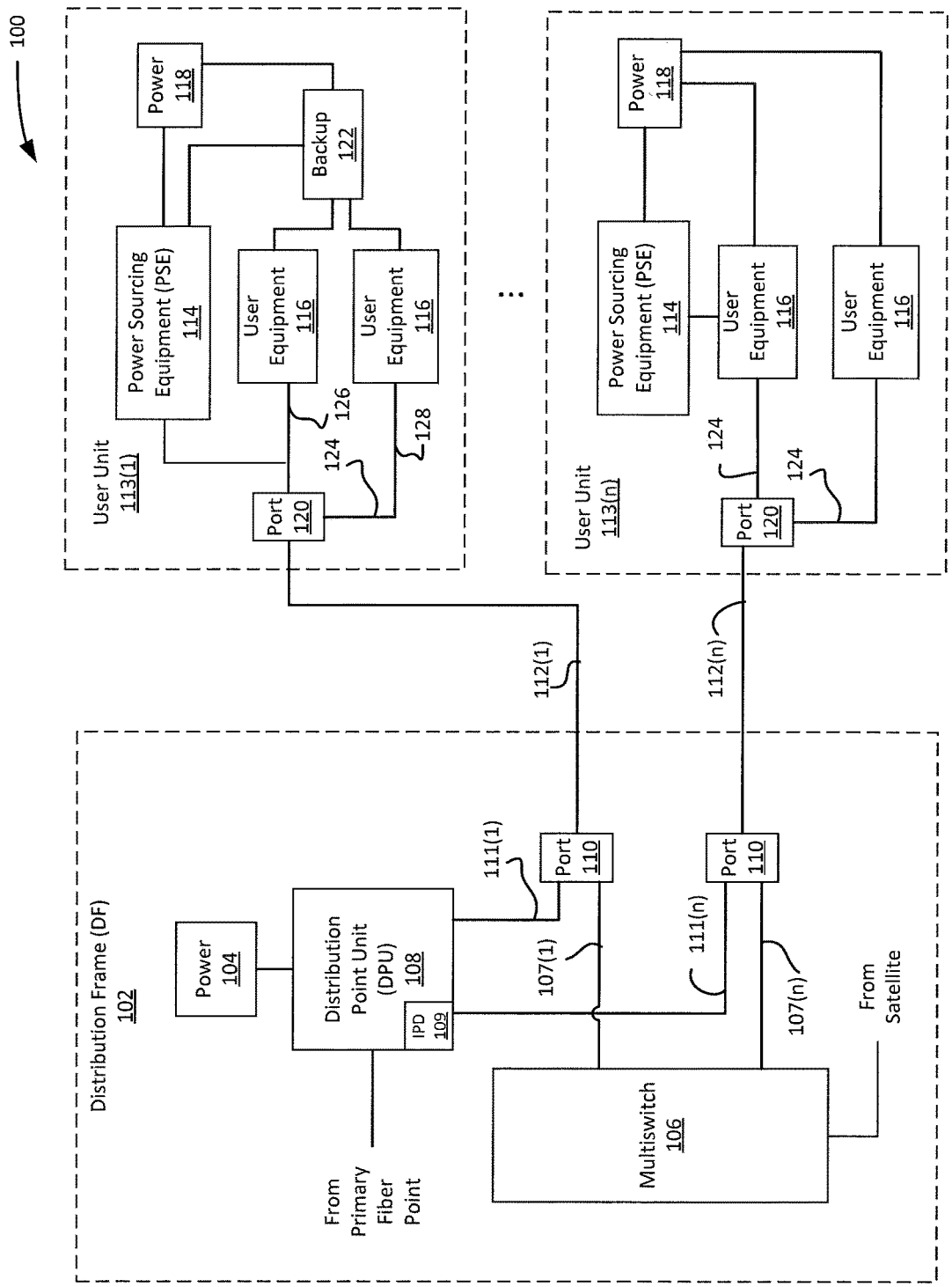
FIG. 1 is a block diagram of one embodiment of system utilizing intelligent power distribution.

Referring to FIG. 1, a system 100 is shown that includes a distribution frame (DF) 102 and one more instances of a user unit 113(1) . . . 113(n). DF 102 in one example is a device or facility at which optical cables are terminated, interconnected, and/or distributed. For example, DF 102 may be a main distribution frame (MDF) or intermediate distribution frame (IDF) of a network communication system.

It should be noted that system 100 is shown in an exemplary configuration for illustrative purposes in this disclosure and should not be limited to what is depicted in FIG. 1. System 100 may include additional DFs 102 and user units 113(1) . . . 113(n). System 100 may include addition user equipment and/or network equipment beyond that which is shown. In addition, the configuration of system 100 may take other forms. For instance, there may be a plurality of DFs 102 or network equipment located within system 100 and between DF 102 and user units 113(1) . . . 113(n). In addition, user units 113(1) . . . 113(n) may include additional equipment and/or different configurations than what is shown in FIG. 1. Referring further to FIG. 1, DF 102 in one example includes a power source 104, a multiswitch 106, a distribution point unit (DPU) 108, an intelligent power distribution (IPD) component 109, and one or more ports 110.

Power source 104 provides the electricity that powers DF 102. Power source 104 in one embodiment may be a power interface to a public electrical grid. In another example, power source 104 may be a power interface to a private electrical grid. In another example, power source 104 may be a power interface to a power source, such as a generator or battery bank.

Multiswitch 106 in one example is a device that distributes a signal to multiple end points. In the example shown, multiswitch 106 receives a satellite signal and distributes the signal through outputs 107(1) . . . 107(n) through ports 110 to user units 113(1) . . . 113(n). It should be noted that the depiction of a satellite signal is used for illustrative purposes only and other types of data signals are contemplated by this disclosure. In addition, multiswitch 106 may be operable to receive multiple input signals and distribute signals to multiple end points.

DPU 108 in one embodiment is a device that receives signals from a fiber optic network, processes the signals, and then distributes the processed signals to user units 113(1) . . . 113(n). In one example, DPU 108 connects to a fiber optic network and then modulates signals that it receives for distribution over existing wiring, such as copper telephone wiring or coaxial cable, of user units 113(1) . . . (113(n). International Telecommunication Union (ITU) standards ITU-T G.9700 and G.9701, which are hereby incorporated by reference, describe examples of functionality by which fiber optic signals may be processed and distributed over existing wiring. DPU 108 includes outputs 111(1) . . . 111(n) which correspond to user units 113(1) . . . 113(n). DPU 108 may receive power from power source 104. DPU may also receive power from user units 113(1) . . . 113(n) in accordance with principles of operation that will be further described herein.

Ports 110 receive outputs 107(1) . . . 107(n) from multiswitch 106 and outputs 111(1) . . . 111(n) from DPU 108, combine the signals, and distribute the combined signals over interfaces 112(1) . . . 112(n) to user units 113(1) . . . 113(n). In one example, a port 110 may be a combiner or demultiplexer.

Referring further to FIG. 1, DPU 108 in one embodiment includes IPD component 109. It should also be noted that although IPD component 109 is shown as part of DPU 108, it also may be a standalone component, or it may reside in another part of a network in which system 100 resides. IPD component 109 provides functionality which determines a power mode of DPU 108. In one embodiment, the power mode describes the sources of power that are used to power DPU 108. For example, in a first power mode, DPU 108 may receive power exclusively from power source 104. In a second power mode, DPU 108 may receive power exclusively from user units 113(1) . . . 113(n). In a third power mode, DPU 108 may receive power from a combination of power source 104 and one or more of user units 113(1) . . . 113(n). In a fourth power mode, DPU 108 may receive power from one or more user units 113(1) . . . 113(n) if a condition should occur, such as a loss of power at power source 104.

It should be noted that a power mode may also include providing a balance among a number of power sources and/or components or devices to be powered. For instance, if DPU 108 were powered by user units 113(1) . . . 113(n), IPD 109 may determine the percentage of power that each user unit 113(1) . . . 113(n) is providing to DPU 108. The percentages may be the same for the user units 113(1) . . . 113(n) or the percentages may be unique to the user units 113(1) . . . 113(n). IPD 109 may also determine percentages between power supply 104 and user units 113(1) . . . 113(n). For example, IPD 109 may determine that power supply 104 should provide 50% of power to DPU 108 and user units 113(1) . . . 113(n) should provide the other 50%. Then, IPD 109 may determine that a first user unit 113(1) should provide a certain percentage of the 50% and the other user units 113(n) should provide the remaining percentage of the 50%. IPD 109 may also determine that certain components of DPU 108 will be powered by user units 113(1) . . . 113(n) and certain components will not. In another example, IPD 109 may determine that certain components of DPU 108 will be powered equally by user units 113(1) . . . 113(n) and other components of DPU will be powered entirely by the user unit 113(1) . . . 113(n) that uses such components.

Referring further to FIG. 1, user units 113(1) . . . 113(n) in one example are locations, facilities, or dwellings at which an entity consumes data that is provided to the user units 113(1) . . . 113(n) from the DF 102. For example, a user unit 113 may be an apartment, a house, an office, or any location in which network data is received by an entity. User units 113(1) . . . 113(n) in one example comprise power sourcing equipment (PSE) 114, user equipment 116, power source 118, and port 120. In addition, one or more (or none) of user units 113(1) . . . 113(n) (e.g., user unit 113(1)) may include a power backup system 122. The preceding components are coupled together through connectors 124, such as wiring or cable. The letter "n" represents the number of user units 113 to which DF 102 provides service. For example, DF 102 would provide service to 4 user units if n were to equal 4 or 8 units if n were to equal 8. This disclosure does not contemplate a theoretical limitation on the value of n.

PSE 114 in one example provides the functionality by which power may be supplied by user units 113(1) . . . 113(n) to power one or more components of DF 102, including DPU 108. PSE 114 is coupled to power source 118 within user units 113(1) . . . 113(n). PSE 114 in one example receives power from power source 118 and injects the power into wiring 124 such that power may be sent back to DPU 108 and used to power DPU 108 and/or one or more other devices residing at DF 102. In another example, shown with respect to user unit 113(n), PSE 114 injects power into wiring 124 through user equipment 116, which may have circuitry and functionality that allows the user equipment 116 to receive and send power. The preceding functionality is referred to as reverse power feeding. A description of reverse power feeding may be found in European Telecommunications Standards Institute (ETSI) standard 101 548 RPF and Broadband Form standard BBF WT-338, which are hereby incorporated by reference.

Due to reverse power feeding, it is possible for power provided by one or more of user units 113(1) ... 113(n) to power DPU 108 and/or one or more other devices at DF 102. As was discussed earlier, DPU 108 may be entirely powered by power source 104 or by user units 113(1) ... 113(n) through reverse power feeding. In another example, DPU 108 may be powered by a combination of power source 104 and reverse power feeding. In another example, DPU 108 may be powered by power source 104 unless a condition occurs making it desirable to power DPU 108 by reverse power feeding. For instance, if a loss of power were to occur at DF 102, DPU 108 may elect to draw power from user units 113(1) ... 113(n) through reverse power feeding.

Referring further to FIG. 1, user equipment 116 may include various devices that reside within user units 113(1) ... 113(n) and are utilized to receive and/or consume data. For example, user equipment 116 may include, but is not limited to, video receivers, network termination equipment (NTE), cable modems, routers, personal computers, laptops, laptops, tablets, etc.

Power source 118 provides the electricity to user units 113(1) ... 113(n). Power source 118 in one embodiment may be a power interface to a public electrical grid. In another example, power source 118 may be a power interface to a private electrical grid. In another example, power source 118 may be a power interface to a power source, such as a generator or battery bank.

Port 120 is operable to receive combined signals from ports 110 of DF 102 and distribute the signals to the various user equipment 113 within the user units 113(1) ... 113(n). In one embodiment, port 120 is operable to split signals from DF 102 and distribute the signals over wiring 124 to user equipment 113. In one example, port 120 may be a triplexer.

Power backup system 122 in embodiment is a battery backup system. In another embodiment, power backup system 122 may be a generator. Power backup system 122 is operable to provide power to user unit 113(1) in the event that user unit 113(1) loses power. For instance, user unit 113(1) may lose power and accordingly, power source 118 may not be able to provide power to user equipment. Therefore, power backup system 122 could be actuated, either automatically or manually, such that it could provide power to user equipment 116. In one embodiment, power backup system 122 would also provide power to power sourcing equipment 114, as will be discussed further herein. It should be noted that user unit 113(1) is shown with power backup system 122 and user unit 113(n) is shown without such a system for illustrative purposes only. It should be understood that some, all, or none of user units 113(1) ... 113(n) may have power backup systems 122.

In addition, it should be understood that the description provided herein should not be construed as being limited to the exemplary configuration of system 100. The principles of intelligent power distribution as described herein may be applied to other systems to provide power backup intelligently and selectively from a first system, having a backup power system, to one or more components of a second system, which does not have a backup power system, but that is providing a service to the first system.

Figure 2:
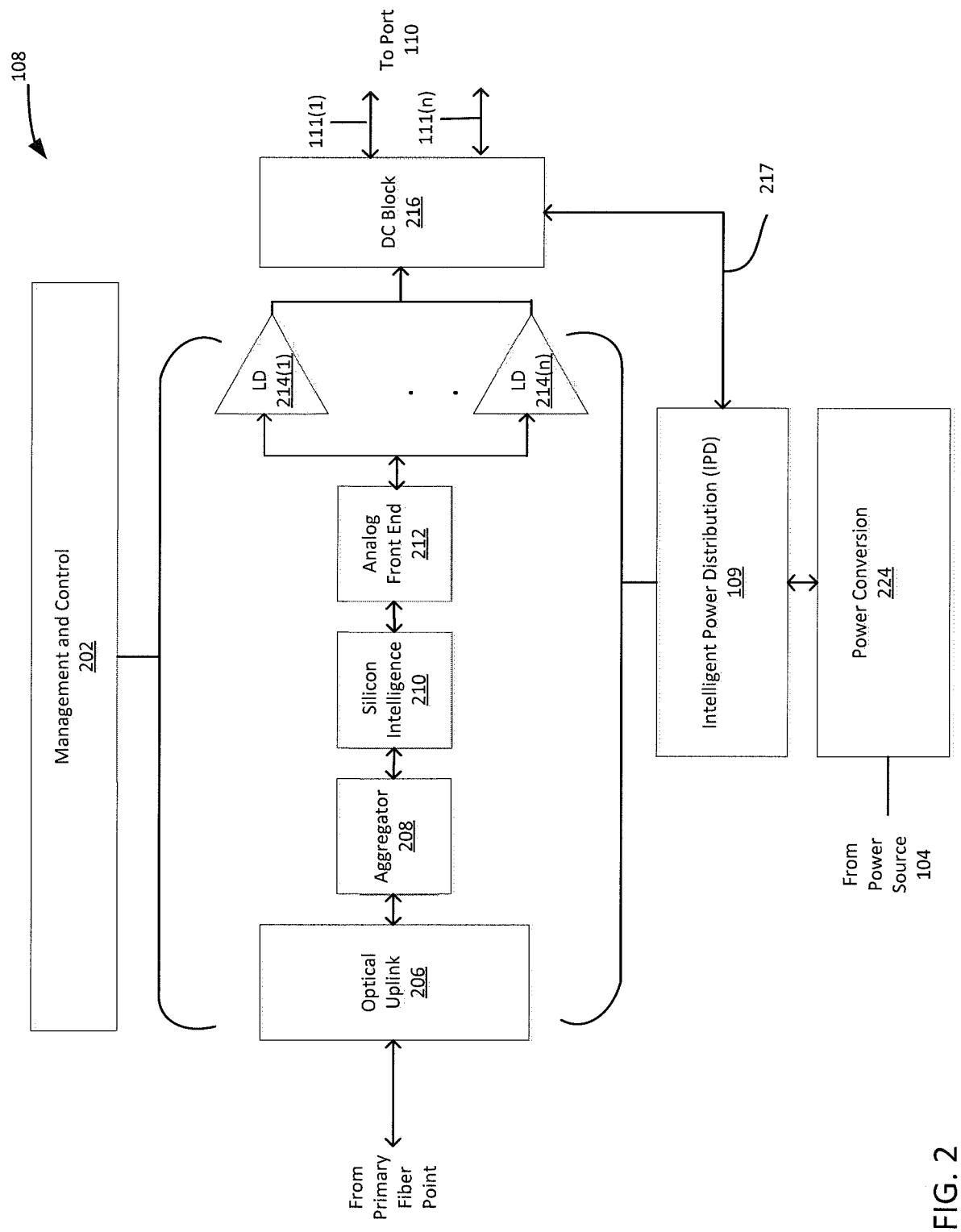
FIG. 2 is a block diagram one embodiment of a distribution point unit (DPU) utilizing intelligent power distribution in accordance with one aspect of this disclosure.

Referring to FIG. 2, an exemplary description of DPU 108 will now be provided for illustrative purposes. DPU 108 in one example comprise management and control layer 202, optical uplink 206, aggregator 208, silicon intelligence 210, analog front end 212, one or more instances of line driver 214, DC Block 216, Power conversion component 224, and IPD 109.

Management and control layer 202 in one example provides the central management and control functionality to operate DPU 108. For instance, management and control layer 202 may control the input, output, and distribution of signals to/from DPU 108.

Optical uplink 206 is the interface that connects to the primary fiber point. In one embodiment, optical uplink 206 is a small form factor pluggable (SFP) transceiver. In another embodiment, optical uplink 206 may include multiple SFP transceivers. For instance, one SFP transceiver may connect to the primary fiber point and another SFP may be used to connect to another DPU 108 in the event that an operator wanted to daisy chain DPUs 108. Optical uplink 206 may be operable to connect to one or more fiber optical networks, such as a passive optical network (PON), a gigabit passive optical network (G-PON), and a XG-PON network.

Aggregator 208, silicon intelligence 210, and analog front end 212 are the components that receive and process bi-directional data signals received through optical uplink 206 or from user units 113(1) ... 113(n). These components process, modulate, demodulate, combine, and/or separate signals for transmission over the primary fiber network or to user units 113(1) ... 113(n). For example, aggregator 208 may aggregate traffic and host management software. Silicon intelligence 210 in one example comprises a field programmable gate array (FGPA) comprised of a plurality of digital signal processors that drive signal to a corresponding user unit 113(1) ... 113(n). Analog front end 212 in one example is utilized to modulate digital signals into analog format such that they may be transmitted over an analog domain.

Referring further to FIG. 2, line drivers 214(1) ... 218(n) in one example are bi-directional amplifiers corresponding to outputs 111(1) ... 111(n) that amplify signals to/from analog front end 212 such that they have sufficient signal strength to reach their respective user unit 113(1) ... 113(n). DC block 216 is utilized to extract DC voltage from that is sent from user units 113(1) ... 113(n) over interfaces 112(1) ... 112(n) in accordance with reverse power feed technology. DC block 216 in one example provides extracted DC voltage to IPD 109 over interface 217.

Power conversion component 224 receives power from power source 104 and converts AC power to DC power for utilization by DPU 108.

Referring further to FIG. 2, an exemplary description of the operation of IPD 109 will now be provided for illustrative purposes.

As was discussed earlier, in one embodiment, IPD 109 determines the power mode of DPU. In one example, IPD 109 may make a power mode determination for DPU 108 and provide instructions to management and control layer 202 to implement the power mode. In another embodiment, IPD 109 may include the functionality to implement the power mode itself. Implementing the power mode may take different forms. In one example, IPD 109 may receive power, from power conversion component 224 and DC block 216, and distribute the power to one or more components of DPU 108 or DF 102 to power those components in accordance with the power mode that it has calculated.

For example, IPD 109 may elect to receive power from one or more of user units 113(1) ... 113(n) and no power from power source 104, or vice versa. In another example, IPD may elect to receive power from one or more user units 113(1) ... 113(n) and from power source 104. IPD 109 may elect to power all or some of the components of DPU 108 in accordance with power mode it selects. For instance, if there were a power outage in user units 113(1) ... 113(n), IPD 109 may select a power mode by which it only receives power from those user units 113(1) . . . 113(n) that include power backup systems 122. IPD 109 may elect to power only those components of DPU 108 that provide service to the user units 113(1) . . . 113(n) with power backup systems 122. IPD 109 in one example may power components of DPU 108 such that the user units equally share the burden 113(1) . . . 113(n) having power backup systems 122.

Figure 3:
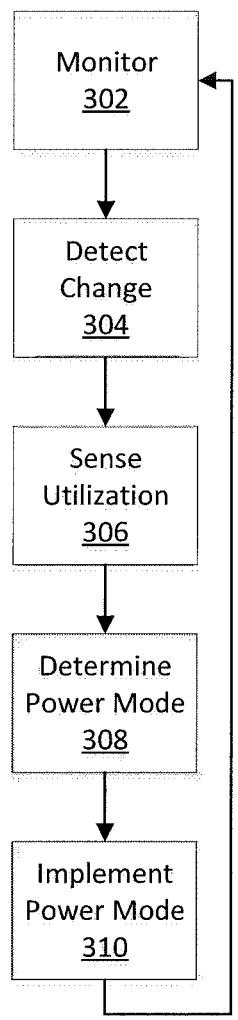
FIG. 3 is flowchart depicting one embodiment of a process for implementing intelligent power distribution.

Referring to FIGS. 2 and 3, an exemplary process 300 of intelligent power distribution will now be described for illustrative purposes.

In step 302, IPD 109 monitors power distribution and activity of DPU 108 in accordance with a power mode. In one example, IPD 109 may provide power to all of the components of DPU (i.e., optical link 206, aggregator 208, line drivers 214, etc.) through power drawn entirely from power source 104. In step 304, IPD 109 may detect a change in the power consumption of system 100. For example, IPD 109 may detect a power outage at power source 104. If a power outage were to occur, IPD 109 may continue to function through use of power reverse power provided by one or more of user units 113(1) . . . 113(n). In another example, IPD 109 may utilize a source of backup power to continue to function.

Referring further to FIG. 3, in step 306, IPD 109 senses utilization of the components of DPU 108 from user units 113(1) . . . 113(n). It is possible that there may be a power outage in one or more of user units 113(1) . . . 113(n). If that were the case, then those user units 113(1) . . . 113(n) with power backup systems 122 would continue to have functioning user equipment 116. Those user units 113(1) . . . 113(n) would also be the only units capable of providing reverse power to DPU 108. IPD 109 would sense which user units were continuing to function. IPD 109 may sense such activity by monitoring signals being sent over interfaces 112(1) . . . 112(n). In another example, IPD 109 may have a record of the user units 113(1) . . . 113(n) that have power backup systems 122. For instance, an entity may register that its user unit 113 has a power backup system 122 prior to a power outage taking place. In such an example, IPD 109 may have access to a database of user units 113(1) . . . 113(n) that have power backup systems 122.

In step 308, IPD 109 would determine a new power mode. In one example, determining a new power mode comprises using the number of user units 113(1) . . . 113(n) that continue to function as a parameter in calculating the new power mode. In one example, IPD 109 may elect to only power those components of DPU 108 serving user units 113(1) . . . 113(n) that continue to function. In a power outage, if user unit 113(1) and 113(2) were the only user units that continued to send/receive data from DPU 108, IPD 109 may determine to power only those components of DPU 108 that provide service to units 113(1) and 113(2). Some or all of the components of DPU 108 that serve the other user units 113(3) . . . 113(n) would not receive power. For example, IPD 109 may elect to only supply power to LD 214(1), LD 214(2) and those portions of aggregator 208, silicon intelligence 210, and analog front end 212 that serve user units 113(1), 113(2). IPD 109 would not provide power to the other components and subcomponents.

In step 310, IPD 109 would implement the power mode determined in step 308 and return to step 302 in which it would monitor the power consumption and activity in DPU 108. If power were to return to the other user units, IPD 109 would sense activity from interfaces 112(3) . . . 112(n) and resume powering those portions of DPU 108 that serve user units 113(3) . . . 113(n).

Figure 4:
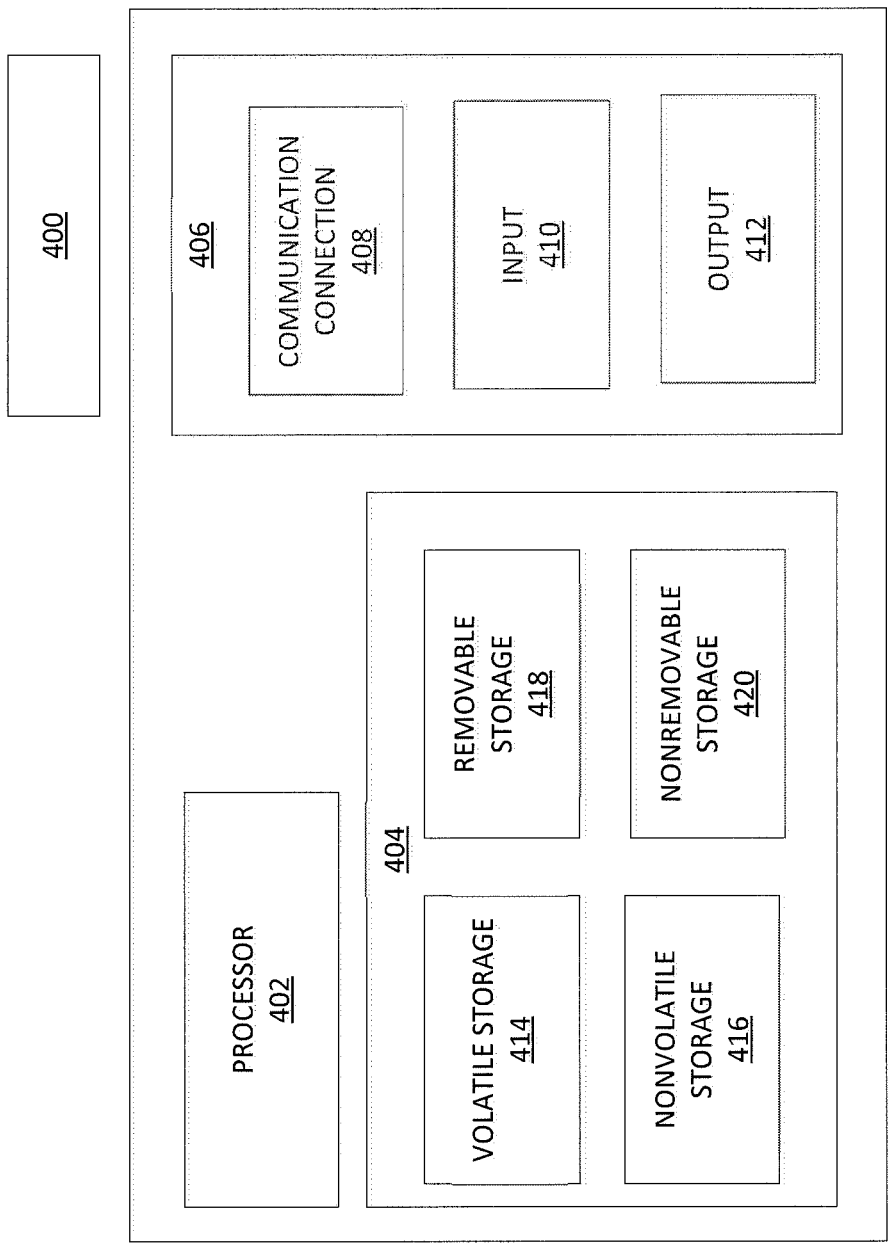
FIG. 4 is a block diagram of one embodiment of a hardware device that can be utilized to implement intelligent power distribution in accordance with one aspect of this disclosure.

FIG. 4 is a block diagram of computing device 400 that may be connected to or comprise one or more components of system 100. Computing device 400 may comprise hardware or a combination of hardware and software. The functionality to facilitate telecommunications via a telecommunications network may reside in one or combinations of computing devices 400. Computing device 400 depicted in FIG. 4 may represent or perform functionality of an appropriate computing device 400, or combination of computing devices 400, such as, for example, a component or various components of a network, a processor, a server, or the like, or any appropriate combination thereof. It is emphasized that the block diagram depicted in FIG. 4 is exemplary and not intended to imply a limitation to a specific implementation or configuration. Thus, computing device 400 may be implemented in a single device or multiple devices (e.g., single controller or multiple controllers). Computing device 400 may comprise a processor 402 and a memory 404 coupled to processor 402. Memory 404 may contain executable instructions that, when executed by processor 402, cause processor 402 to effectuate operation for performing intelligent power distribution. As evident from the description herein, computing device 400 is not to be construed as software per se.

In addition to processor 402 and memory 404, computing device 400 may include an input/output system 406. Processor 402, memory 404, and input/output system 406 may be coupled together (coupling not shown in FIG. 4) to allow communications therebetween. Each portion of computing device 400 may comprise circuitry for performing functions associated with each respective portion. Thus, each portion may comprise hardware, or a combination of hardware and software. Accordingly, each portion of computing device 400 is not to be construed as software per se. Input/output system 406 may be capable of receiving or providing information from or to a communications device or network entities configured for telecommunications. For example, input/output system 406 may include a wireless communications (e.g., 3G/4G/GPS) card. Input/output system 406 may be capable of receiving or sending video information, audio information, control information, image information, data, or any combination thereof. Input/output system 406 may be capable of transferring information with computing device 400. In various configurations, input/output system 406 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 406 may comprise a Wi-Fi finder, a two-way GPS chipset or equivalent, or the like, or a combination thereof.

Input/output system 406 of computing device 400 also may contain a communication connection 408 that allows computing device 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 406 may also include an output device 412, such as a display, speakers, or a printer.

Memory 404 of computing device 400 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of RAM), a nonvolatile storage 416 (such as ROM, flash memory), or a combination thereof. Memory 404 may include additional storage (e.g., a removable storage 418 or a nonremovable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by computing device 400. Memory 404 may comprise executable instructions that, when executed by processor 402, cause processor 402 to effectuate operations to map signal strengths in an area of interest.

While intelligent power distribution has been described in connection with the numerous examples of the various figures, it is to be understood that other similar implementations may be used, or modifications and additions may be made to the described examples of a without deviating therefrom. Therefore, the principles described herein should not be limited to any single example, but rather should be construed in breadth and scope in accordance with the appended claims. One skilled in the art will recognize that the aspects described in the instant application may apply to many environments and may be applied to any number of such devices connected via a communications network and interacting across the network.

The invention claimed is:

1. A method of providing power to a distribution point unit connected to a plurality of user units in a telecommunications system, comprising:
   selecting, based on a determination that a user unit of the plurality of user units has backup power, a power mode that provides a percentage of the backup power that each of the plurality of user units gives to the distribution point unit when the distribution point unit has a loss of power; and
   implementing the power mode on the distribution point unit responsive to the loss of the power.

2. The method of claim 1, wherein the determination comprises:
   monitoring a communications interface;
   detecting at least one signal from that communications interface that originates from the user unit.

3. The method of claim 1, wherein the determination comprises:
   identifying in a database that the user unit has the backup power.

4. The method of claim 1, wherein the determination comprises:
   determining that multiple user units have the backup power.

5. The method of claim 4, wherein the step of selecting comprises:
   calculating a percentage of the power of each of the plurality of user units based on a number of the multiple user units that have the backup power.

6. The method of claim 5 wherein the step of calculating comprises:
   identifying one or more components of the distribution point unit that provide service to the multiple user units.

7. The method of claim 6, wherein the step of implementing comprises:
   supplying the power to the components of the distribution point unit that provide the service to the multiple user units.

8. The method of claim 7, further comprising:
   disabling the power to other components of the distribution point unit that do not provide the service to the multiple user units.

9. A system to provide power to a distribution point unit connected to a plurality of user units in a telecommunications system, comprising:
   a processor; and
   a memory coupled with the processor, the memory comprising executable instructions that when executed by the processor cause the processor to effectuate operations comprising:
   selecting, based on a determination that a user unit of the plurality of user units has backup power, a power mode providing a percentage of the power that the plurality of user units provide as the backup power to the distribution point unit when the distribution point unit has a loss of power; and
   implementing the power mode on the distribution point unit responsive to the loss of the power.

10. The system of claim 9, wherein determining comprises:
    monitoring a communications interface;
    detecting at least one signal from that communications interface that originates from the user unit.

11. The system of claim 9, wherein determining comprises:
    identifying in a database that the user unit has the backup power.

12. The system of claim 9, wherein determining comprises:
    determining that multiple user units have the backup power.

13. The system of claim 12, wherein selecting comprises:
    calculating the power mode based on a number of the multiple user units that have the backup power.

14. The system of claim 13 wherein calculating comprises:
    identifying one or more components of the distribution point unit that provide service to the multiple user units.

15. The system of claim 14, wherein implementing comprises:
    supplying the power to the components of the distribution point unit that provide the service to the multiple user units.

16. The system of claim 15, wherein the operations further comprise:

disabling the power to other components of the distribution point unit that do not provide the service to the multiple user units.

17. A method of power operation in a network comprising a data distribution system and one or more destination systems that exchange data with the data distribution system, the method comprising:

determining a power mode that defines a percentage of power among a destination system that includes an alternate power source to provide the power to the data distribution system when the data distribution system has a loss of power; and enabling the data distribution system to receive the power according to the power mode responsive to the loss of the power.

18. The method of claim 17, wherein the step of identifying comprises:

accessing a database that includes a list of the destination systems that have alternate power sources.

19. The method of claim 17, wherein the step of determining comprises:

monitoring an interface between the destination system and the data distribution system; and identifying activity on the interface.

20. The method of claim 17, further comprising:

disabling components of the data distribution system that are used to provide service to destination systems that do not include the alternate power source.

* * * * *